United States Patent [19]

Abiko

[11] Patent Number: 4,920,822
[45] Date of Patent: May 1, 1990

[54] LEATHER-COVERED STEERING WHEEL

[75] Inventor: Toru Abiko, Aichi, Japan

[73] Assignee: Toyoda Gosei Co., Ltd., Nishikasugai, Japan

[21] Appl. No.: 381,970

[22] Filed: Jul. 19, 1989

[30] Foreign Application Priority Data

Aug. 22, 1988 [JP] Japan .......................... 63-109911[U]

[51] Int. Cl.⁵ ............................................ B62D 1/04
[52] U.S. Cl. .............................................. 74/552; 74/558
[58] Field of Search ...................... 74/552, 558, 558.5; 280/777, 778, 750; 29/159 B

[56] References Cited

U.S. PATENT DOCUMENTS

| | | | |
|---|---|---|---|
| 3,802,291 | 4/1974 | Young, Jr. et al. | 74/552 |
| 3,876,844 | 4/1975 | Scherenberg | 74/552 X |
| 3,930,420 | 1/1976 | Kizu et al. | 74/558.5 X |
| 3,938,404 | 2/1976 | Murase et al. | 74/552 X |
| 4,188,455 | 10/1978 | Byrn | 74/558 |
| 4,353,266 | 10/1982 | Grothe | 74/552 |
| 4,419,908 | 12/1983 | Reikowski | 74/552 |
| 4,535,221 | 8/1985 | Holsworth | 74/558 X |
| 4,547,655 | 10/1985 | Kurata et al. | 74/552 X |
| 4,581,954 | 4/1986 | Uchida | 74/552 |
| 4,625,578 | 12/1986 | Nishijima | 74/552 X |
| 4,631,976 | 12/1986 | Noda et al. | 74/552 |
| 4,800,775 | 1/1989 | Iuchi | 29/159 B X |

FOREIGN PATENT DOCUMENTS

| | | | |
|---|---|---|---|
| 2424841 | 11/1979 | France | 74/558 |
| 53-21579 | 7/1978 | Japan | 74/552 |
| 0151173 | 8/1985 | Japan | 74/552 |

Primary Examiner—Vinh T. Luong
Attorney, Agent, or Firm—Cushman, Darby & Cushman

[57] ABSTRACT

In a leather-covered steering wheel comprising, a metal core including a ring core section and a plurality of spoke core sections, an elastic member for covering the ring core section and the end portions of the spoke core sections thereof at the side of the ring core section, a plurality of plates for maintaining the configuration of the elastic member which are higher in hardness than the elastic cover layer and are formed in correspondence with the peripheral configurations of the end faces of the portions of the elastic cover layer which cover the metal cores in the spoke section are arranged between the leather and the end faces, whereby the number of manufacturing steps and the manufacturing cost are reduced accordingly, and the steering wheel is maintained fine in external appearance.

6 Claims, 3 Drawing Sheets

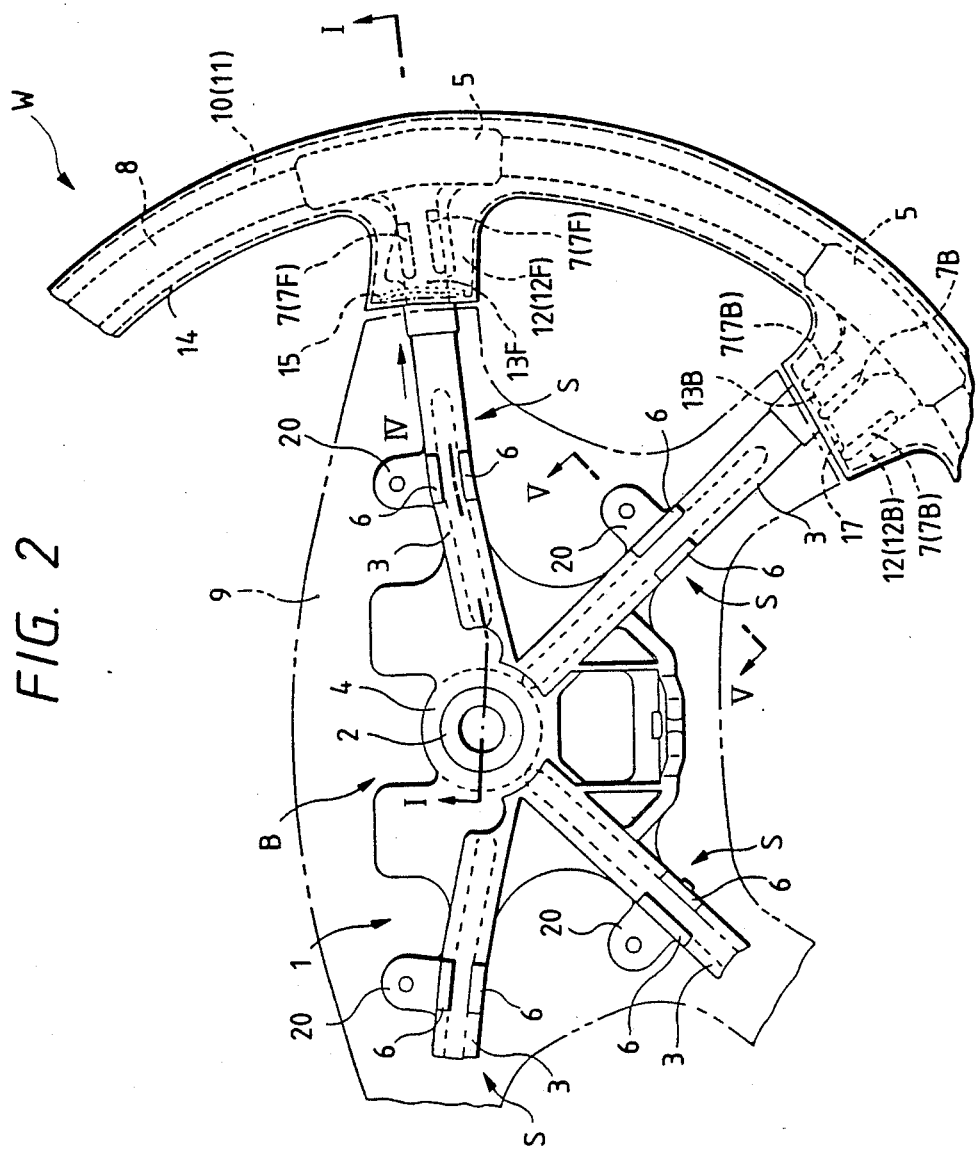

LEATHER-COVERED STEERING WHEEL

BACKGROUND OF THE INVENTION

This invention relates to a leather-covered steering wheel, particularly to a leather-covered steering wheel comprising a metal core including a plurality of spoke core sections and a ring core section, an elastic cover layer for covering the ring core section and the end portions of the spoke core sections at the side of the ring core section, and a leather for covering the elastic cover layer.

In a conventional leather-covered steering wheel, the ring core section of the metal core and the end portions of a plurality of spoke core sections of the metal core thereof at the side of the ring section are formed to be covered with an elastic cover layer of highly foamed urethane. Further, the elastic cover layer is covered with a leather such as natural leather or synthetic leather with a sponge-like chloroprene rubber material held therebetween (cf. Japanese Patent Application Examined Publication No. 21579/1978 and USP 3,802,291).

In the conventional leather-covered steering wheel, the elastic cover layer has some degree of hardness, 65 to 80 in the degree of hardness (ASTM, shore hardness A). Therefore, the steering wheel is free from a difficulty that the corners of the portions of the elastic cover layer which portions are on the side of the end faces are deformed, or greatly curved, even if the elastic cover layer is covered with the leather while tension is applied to the leather by sewing the leather together with string.

On the other hand, in order to reduce the number of manufacturing steps and the manufacturing cost of the conventional leather-covered steering wheel, the following method has been employed. The use of chloroprene rubber material is eliminated, instead, in order to maintain substantially unchanged the soft feeling with the ring section when gripped, or to make it softer, an elastic cover layer lower in hardness (35 to 65 in the degree of hardness (ASTM, Shore hardness A)) is employed. In this case, since the elastic cover layer is soft, when it is covered with the leather under such a condition that tention is applied to the leather by sewing the leather together with string, the corners of the portions of the elastic cover layer which are on the side of the end faces are liable to be deformed, with the result that the steering wheel is degraded in external appearance.

SUMMARY OF THE INVENTION

Accordingly, an object of this invention is to eliminate the above-described difficulties accompanying a conventional leather-covered steering wheel.

More specifically, an object of the invention is to provide a leather-covered steering wheel in which, in the case where the use of chloroprene rubber material is eliminated in order to reduce the number of manufacturing steps and the manufacturing cost, and an elastic cover layer softer is used to maintain substantially unchanged the soft feeling with the steering wheel when gripped, the corners of the portions of the elastic cover layer over the spoke sections which are on the side of the end faces thereof are prevented from deformation when the elastic cover layer is covered with the leather, while tension is applied to the leather by sewing together with string, whereby the steering wheel is maintained fine in external appearance.

The foregoing object and other objects of the invention have been achieved by the provision of a leather-covered steering wheel comprising a metal core including a ring core section and a plurality of spoke core sections, an elastic cover layer for covering the ring core section of the metal core and the end portions of the spoke core sections of the metal core at the side of the ring core section, a leather for covering the elastic cover layer, and a plurality of the configuration maintaining plates for maintaining the elastic member, each of the plates being formed between the end portion of the elastic cover layer covering the parts of the spoke core sections of the metal core and leather, and each of the plates being higher in hardness than the elastic cover layer the plates having a configuration corresponding to the outer periphery edge of the end portion of the elastic cover layer.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a plan view showing essential components of the leather-covered steering wheel;

DETAILED DESCRIPTION OF THE INVENTION

One example of a leather-covered steering wheel according to this invention will be described with reference to the accompanying drawings.

Figure 1:
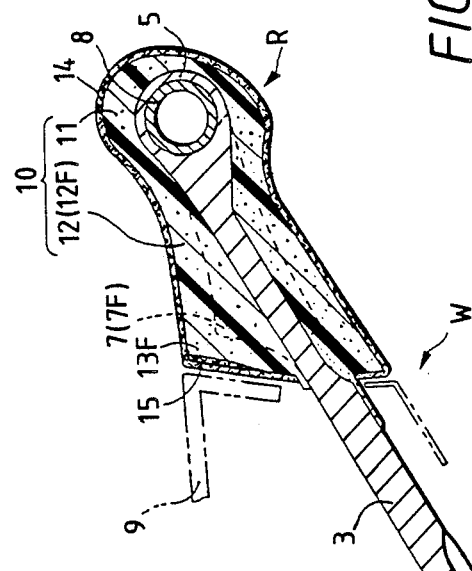
FIG. 1 is a sectional view taken along line I—I in FIG. 2, showing one example of a leather-covered steering wheel according to this invention.

The leather-covered steering wheel of the invention, as shown in FIGS. 1 and 2, comprises a metal core unit 1 which is made up of a boss section B including a boss 2, a ring section R including a metal core 8 made of a steel pipe (hereinafter referred to as "a ring-section metal core 8", when applicable), and spoke sections S including metal core 3 (hereinafter referred to as "spoke-section metal core 3", when applicable). In the metal core unit 1, only each of the spoke-section metal cores 3 is made of a die cast metal such as aluminum alloy or magnesium alloy. Each of the spoke-section metal cores 3 has a common coupling part 4 at the base end into which the boss 2 is inserted when cast so that each of the spoke-section metal cores 3 is integral with the boss 2, and outer end of each of the spoke-section metal cores 3 has a coupling part 5 into which the ring-section metal core 8 is inserted when cast. The ring-section metal core 8 and the end portions of the spoke-section metal cores 3 which portions are closer to the ring-section metal core 8 are covered with an elastic cover layer 10, and the latter 10 is covered with a leather 14 such as natural leather.

The elastic cover layer 10 is made of a sufficiently foamed soft urethane material, and it is made lower in hardness than the conventional one, that is, its degree of hardness is 35 to 65 (ASTM, Shore hardness A).

Each of the coupling parts 5 of the spoke-section metal cores 3 has a plurality of ribs 7 (or 7F and 7B) on the end portion closer to the ring section R in such a manner that the ribs 7 are extended along the axis of each of the spoke-section metal cores 3. The ribs 7 are used to make the thickness of a ring-section cover layer 11 (described later) substantially equal to that of spoke-section cover layers 12 (or 12F and 12B) (described later) thereby to allow the operator to feel smooth in operating the steering wheel, and to limit the contraction of the spoke-section cover layers 12 (or 12F and 12B) during molding.

Figure 5:
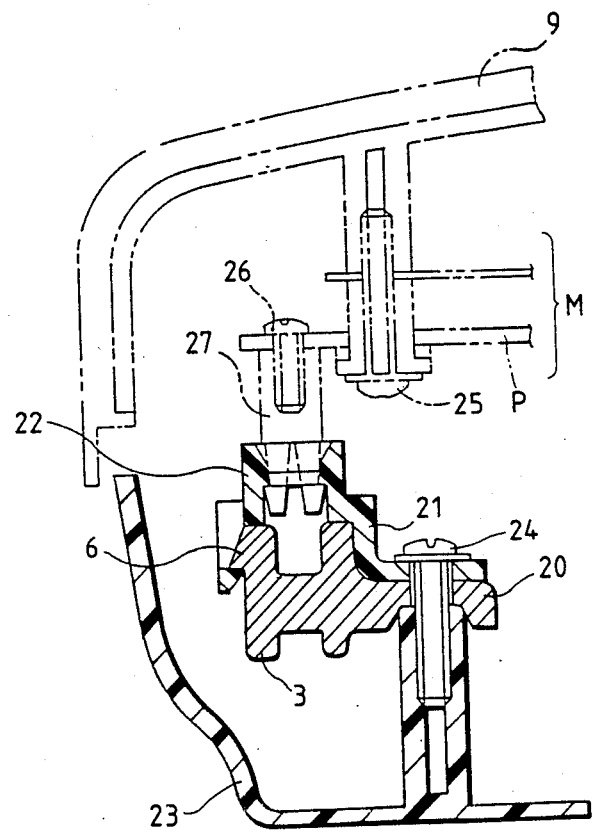
FIG. 5 is a sectional view taken along V—V in FIG. 2, for a description of the installation of a pad on the leather-covered steering wheel.

In addition, each of the spoke-section metal cores 3 has a plurality of ribs 6 on the middle portion in such a manner that the ribs 6 are extended along the axis. The ribs 6, as shown in FIG. 5, serve as seats on which mounting members 21 of hard synthetic resin are mounted thereby to allow a pad 9 to mount over the spoke-section metal cores 3. Each of the mounting members 21 has an engaging cylinder 22, and it together with a lower cover 23 is secured to each of mounting pieces 20 protruded from the respective spoke-section metal cores 3 with a screw 24. The engaging cylinder 22 is to lock a locking leg secured to the pad 9 with a screw 26. A horn switch mechanism M is secured to the pad 9 with screws 25, and it has a stationary plate P, as shown in FIG. 5.

For each of the two spoke-section metal cores 3 on the front side of the steering wheel W, a configuration maintaining plate 15 is provided between the leather 14 and the end face of the spoke-section cover layer 12F which end face is located above the metal core 3 and faced towards the boss section B. The configuration maintaining plate 15 is formed in correspondence to the configuration of the outer periphery of the end face of the spoke-section cover layer 12F, and is bonded to the latter 12F.

Figure 4:
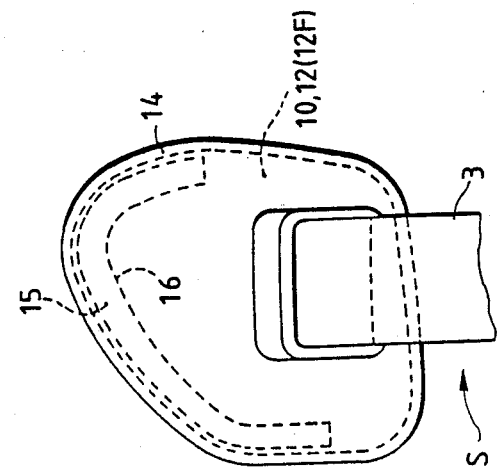
FIG. 4 is a diagram as viewed in the direction of the arrow IV in FIG. 2, showing the configuration maintaining plate.
Figure 3:
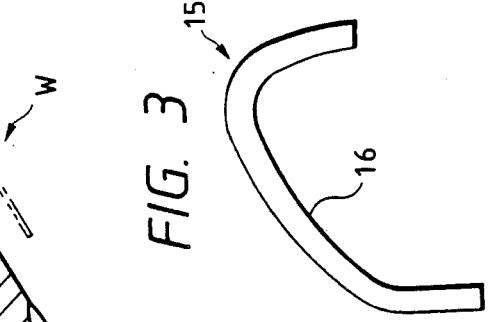
FIG. 3 is a front view showing a configuration maintaining plate used in the leather-covered steering wheel.

The configuration maintaining plate 15 is made of a hard synthetic resin such as ABS which is higher in hardness (the degree of hardness being 110 to 115 (ASTM, Rockwell hardness)) than the elastic cover layer 10 having the thickness of 0.5 to 1.5 mm. The plate 15 is curved as indicated at 16 in FIGS. 3 and 4 to receive the spoke-section metal core 3.

A method of manufacturing the steering wheel will be described. The steering wheel metal core unit 1 is formed by die casting, and is then set in a predetermined metal mold. Under this condition, the elastic cover layer 10 is formed by reaction injection molding. Thereafter, the configuration maintaining plates 15 are bonded to the end faces of the front spoke-section cover layers 12F which are located above the metal cores 3, respectively. The leather 14 is laid over the elastic cover layer 10 and the configuration maintaining plates 15 under tension, and sewed up. In the above-described embodiment, the configuration maintaining plates are bonded to the end faces of the elastic cover layers; however, in forming the cover layer, the configuration maintaining plates may be set in the metal mold at the positions of the end faces of the front spoke-section cover layers so that they are provided inserted in the latter.

When the elastic cover layer 10 is covered with the leather 14 in the above-described manner, the configuration maintaining plates 15 are set at the end faces of the spoke-section cover layer 12F to reinforce the end faces. As a result, the corners 13F of the end portions of the spoke-section cover layers 12F which are on the side of the end faces are substantially undeformable; in other words, the provision of the configuration maintaining plates 15 prevent the deformation of the corners 13F.

Each of the spoke-section cover layers 12F has the other end portion which is away from the end face or located on the side of the ring section R, and at the end portion the configuration maintaining plate 15 is in the form of a plate and smaller in thickness. Accordingly, it still feels soft.

In each of the rear spoke-section cover layers 12B, more ribs 7B are formed on the respective rear spoke-section metal cores 3, and, at the end of the ribs 7B which is on the side of the boss section B, a thin rib 17 is extended upwardly along the end face of the spoke-section cover layer 12B. These ribs 7B and 17 reinforce each of the corners 13B of the end portion of the spoke-section cover layers 12B, and therefore when the cover layer is covered with the leather under tension, the corners 13B will not be deformed.

Thereafter, the mounting members 21 are mounted on the metal cores 3, and the pad 9 is mounted thereon. Thus, the steering wheel W has been manufactured. The steering wheel W thus manufactured is installed on the vehicle.

In the steering wheel of the invention, the deformation of the corners 13F and 13B of the spoke-section cover layers 12 is prevented, and therefore the gaps between the pad 9 and the spoke-section cover layers 12 are not increased beyond a certain value; that is, the clearance between the pad and the spoke-section cover layers is maintained well.

In the above-described leather-covered steering wheel, each of the configuration maintaining plates 15 bonded to the end faces of the spoke-section cover layers 12 has the relatively large recess 16. It is desirable that the recess 16 is such that, when the plate 15 is bonded to the end face, there is about 10 to 15 mm between the plate 15 and the spoke-section metal core 3, because if the recess 16 is smaller, then when the cover layer 12F is gripped for instance, the configuration maintaining plate 15 will interfere with the spoke-section metal core 3, thus lowering the elasticity of the cover layer 12F.

While there has been described in connection with the preferred embodiment of the invention, it will be obvious to those skilled in the art that various changes and modification may be made therein without departing from the invention, and it is aimed, therefore, to cover in the appended claim all such changes and modification as fall within the true spirit and scope of the invention.

What is claimed is:
1. A leather-covered steering wheel, comprising:
a metal core including a ring core section and a plurality of spoke core sections;
an elastic cover layer for covering said ring core section of said metal core and the end portions of said spoke core sections of said metal core thereof at the side of said ring core section;
a leather for covering said elastic cover layer; and
a plurality of configuration maintaining plates for maintaining the configuration of said elastic cover layer, each of said plates being formed between the end portion of said elastic cover layer covering each of the end portions of said spoke sections and leather, said plates being higher in hardness than said elastic cover layer and having a configuration corresponding to the outer periphery edge of the end portions of said elastic cover layer.

2. A leather-covered steering wheel as claimed in claim 1, in which said configuration maintaining plates are spaced about 10 to 15 mm from said each of metal core of said spoke sections when secured.

3. A leather-covered steering wheel as claimed in claim 1, in which said each configuration maintaining plate is made of a hard synthetic resin which is higher in hardness than said elastic cover layer and 110 to 115 in the degree of Rockwell hardness.

4. A leather-covered steering wheel as claimed in claim 1, in which said each configuration maintaining plate has a recess at the center.

5. A leather-covered steering wheel as claimed in claim 1, in which said elastic cover layer is 35 to 65 in the degree of shore hardness A.

6. A leather-covered steering wheel as claimed in claim 1, in which said elastic cover layer is 0.5 to 1.5 mm in thickness.

* * * * *